(12) United States Patent
Shih et al.

(10) Patent No.: US 10,445,883 B1
(45) Date of Patent: Oct. 15, 2019

(54) ID RECYCLE MECHANISM FOR CONNECTED COMPONENT LABELING

(71) Applicant: Ambarella, Inc., Santa Clara, CA (US)

(72) Inventors: Yen-Hsu Shih, Zhubei (TW); Chia-Hung Cheng, Zhubei (TW)

(73) Assignee: Ambarella, Inc., Santa Clara, CA (US)

( * ) Notice: Subject to any disclaimer, the term of this patent is extended or adjusted under 35 U.S.C. 154(b) by 164 days.

(21) Appl. No.: 15/594,884

(22) Filed: May 15, 2017

(51) Int. Cl.
*G06T 7/187* (2017.01)
*G06T 7/194* (2017.01)
*G06K 9/34* (2006.01)
*G06K 9/46* (2006.01)

(52) U.S. Cl.
CPC .............. *G06T 7/187* (2017.01); *G06K 9/342* (2013.01); *G06K 9/4638* (2013.01); *G06T 7/194* (2017.01)

(58) Field of Classification Search
CPC ......... G06T 7/187; G06T 7/194; G06K 9/342; G06K 9/4638
See application file for complete search history.

(56) References Cited

U.S. PATENT DOCUMENTS

| 5,604,821 | A | * | 2/1997 | Ranganathan | G06T 7/254 348/407.1 |
| 6,130,967 | A | * | 10/2000 | Lee | G06T 1/20 345/505 |
| 2009/0196503 | A1 | * | 8/2009 | Sullender | G06K 9/342 382/180 |
| 2009/0196504 | A1 | * | 8/2009 | Sullender | G06K 9/342 382/180 |
| 2009/0196508 | A1 | * | 8/2009 | Sullender | G06K 9/4638 382/201 |
| 2014/0093122 | A1 | * | 4/2014 | Rabinowitz | G06T 1/0021 382/100 |
| 2017/0286815 | A1 | * | 10/2017 | Bradburn | G06K 15/1881 |

* cited by examiner

*Primary Examiner* — Bobbak Safaipour
(74) *Attorney, Agent, or Firm* — Christopher P. Maiorana, PC (57) ABSTRACT

An apparatus includes a processor circuit and an ID recycle circuit. The processor circuit may be configured to generate a component table while performing connected-component labeling on a digital image. The ID recycle circuit is generally in communication with the processor circuit. The ID recycle circuit may be configured to minimize a number of entries in the component table generated by the processor circuit.

20 Claims, 7 Drawing Sheets

ID RECYCLE MECHANISM FOR CONNECTED COMPONENT LABELING

FIELD OF THE INVENTION

The invention relates to image processing and computer vision generally and, more particularly, to a method and/or apparatus for implementing an ID recycle mechanism for connected component labeling.

BACKGROUND

Connected component labeling is an operation frequently used in image processing and computer vision applications to distinguish objects in a picture. Unlike human vision, a picture is "seen" by computer vision (or machine vision) in raster-scan order. In an example where a picture contains a "U"-shape object, since the picture is processed in raster-scan order, the machine will treat the left and right branches of the "U"-shaped object as two objects until the machine reaches the bottom of the "U"-shape object. The machine then realizes the two branches actually belong to one object.

In the conventional technique, the two objects corresponding to the two branches are merged by creating a component table entry with a link between the two branches. As there could be many objects in an image, a large table is needed to store information about each object, including an object ID and a link-pointer indicating whether an object is merged to another object.

It would be desirable to implement an ID recycle mechanism for connected component labeling.

SUMMARY

The invention concerns an apparatus including a processor circuit and an ID recycle circuit. The processor circuit may be configured to generate a component table while performing connected-component labeling on a digital image. The ID recycle circuit is generally in communication with the processor circuit. The ID recycle circuit may be configured to minimize a number of entries in the component table generated by the processor circuit.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing an ID recycle mechanism for connected component labeling that may (i) reduce the number of object IDs used during connected component labeling; (ii) reduce memory needed to store a component table, (iii) be implemented solely in hardware, (iv) recycle object IDs during object detection, and/or (v) be implemented as one or more integrated circuits.

Figure 1:
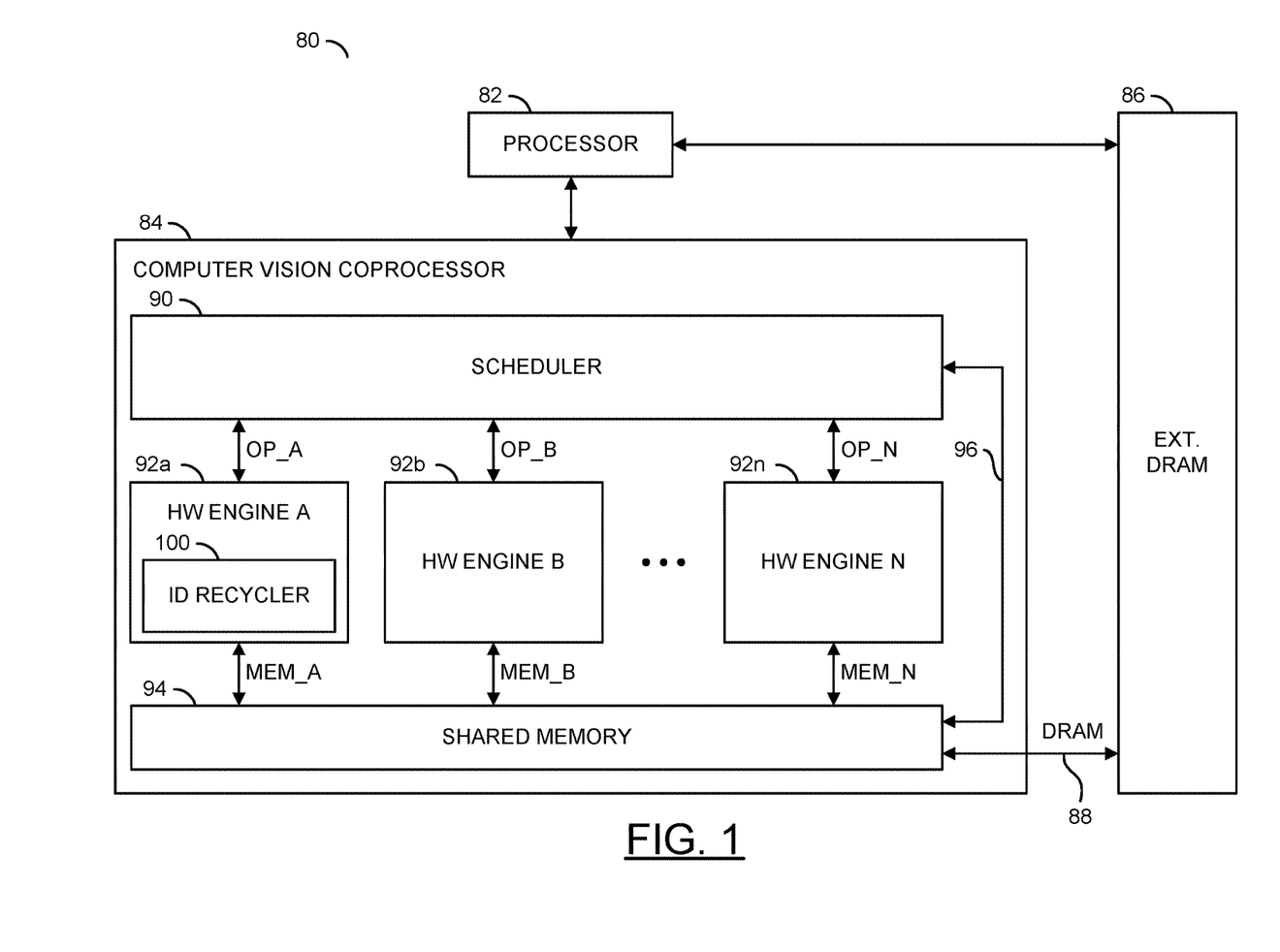
FIG. 1 is a diagram illustrating a context in which an ID recycle mechanism for connected component in accordance with an example embodiment of the invention may be implemented.

Referring to FIG. 1, a diagram of a system 80 is shown illustrating a context in which an ID recycle mechanism for connected component labeling in accordance with an example embodiment of the invention may be implemented. The system (or apparatus) 80 may be implemented as part of a computer vision system. In an example, the computer vision system may be implemented as part of an autonomous vehicle application. In various embodiments, the system 80 may be implemented as part of a camera, a computer, a server (e.g., a cloud server), a smart phone (e.g., a cellular telephone), a personal digital assistant, or the like. The system 80 may be configured for applications including, but not limited to autonomous and semi-autonomous vehicles (e.g., cars, trucks, agricultural machinery, drones, etc.), manufacturing, and/or security/surveillance systems. In contrast to a general purpose computer, the system 80 generally comprises hardware circuitry that is optimized to provide a high performance image processing and computer vision pipeline in minimal area and with minimal power consumption.

In an example embodiment, the system 80 generally comprises a block (or circuit) 82, a block (or circuit) 84, a block (or circuit) 86 and a memory bus 88. The circuit 84 generally comprises a block (or circuit) 90, one or more blocks (or circuits) 92a-92n, a block (or circuit) 94 and a path 96. One or more of the circuits 92a-92n may include a block (or circuit) 100.

Multiple signals (e.g., OP_A to OP_N) may be exchanged between the circuit 90 and the respective circuits 92a-92n. Each signal OP_A to OP_N may convey execution operation information and/or yield operation information. Multiple signals (e.g., MEM_A to MEM_N) may be exchanged between the respective circuits 92a-92n and the circuit 94. The signals MEM_A to MEM_N may carry data. A signal (e.g., DRAM) may be exchanged between the circuit 86 and the circuit 94. The signal DRAM may transfer data between the circuits 86 and 94.

The circuit 82 may implement a processor circuit. In some embodiments, the processor circuit 82 may be a general purpose processor circuit. The processor circuit 82 may be operational to interact with the circuit 84 and the circuit 86 to perform various processing tasks.

The circuit 84 may implement a coprocessor circuit. The coprocessor circuit 84 is generally operational to perform specific (e.g., computer vision related) processing tasks as arranged by the processor circuit 82. In various embodiments, the coprocessor 84 may be implemented solely in hardware. The coprocessor 84 may directly execute a data flow directed to object extraction, including an ID recycle mechanism for connected component labeling, generated by software that specifies processing tasks.

The circuit 86 may implement a dynamic random access memory (DRAM) circuit. The DRAM circuit 86 is generally operational to store multidimensional arrays of input data elements and various forms of output data elements. The DRAM circuit 86 may exchange the input data elements and the output data elements with the processor circuit 82 and the coprocessor circuit 84.

The circuit 90 may implement a scheduler circuit. The scheduler circuit 90 is generally operational to schedule tasks among the circuits 92a-92n to perform a variety of computer vision tasks as defined by the processor circuit 82. Individual tasks may be allocated by the scheduler circuit 90 to the circuits 92a-92n. The scheduler circuit 90 may time multiplex the tasks to the circuits 92a-92n based on the availability of the circuits 92a-92n to perform the work.

Each circuit 92a-92n may implement a processing resource (or hardware engine). The hardware engines 92a-92n are generally operational to perform specific processing tasks. In some configurations, the hardware engines 92a-92n may operate in parallel and independently of each other. In other configurations, all or a portion of the hardware engines 92a-92n may operate collectively to perform allocated tasks. The hardware engines 92a-92n may be implemented as one or more of homogenous processing resources (e.g., all circuits 92a-92n may have the same capabilities) or heterogeneous processing resources (e.g., two or more circuits 92a-92n may have different capabilities). In various embodiments, the circuits 92a-92n may implement one or more operators. The operators performed by the hardware engines 92a-92n may include, but are not limited to, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, comparison operators, indexing operators, a pattern matching operator, a feature extraction operator, a feature detection operator, an object detection operator, a score generating operator, and an upsample operator. In various embodiments, the hardware engines 92a-92n may be implemented solely as hardware circuits.

The circuit 94 may implement a shared memory circuit. The shared memory 94 is generally operational to store all, a portion, or portions of the multidimensional arrays (or vectors) of input data elements and output data elements utilized and/or generated by the hardware engines 92a-92n. The input data elements may be received from the DRAM circuit 86 via the memory bus 88. The output data elements may be sent to the DRAM circuit 86 via the memory bus 88.

The path 96 may implement a transfer path internal to the coprocessor 84. The transfer path 96 is generally operational to move data from the scheduler circuit 90 to the shared memory 94. The transfer path 96 may also be operational to move data from the shared memory 94 to the scheduler circuit 90.

The circuit 100 may implement an ID recycling scheme in accordance with embodiments of the invention. In various embodiments, the circuit 100 may be configured to perform an ID recycle scheme for connected component labeling in accordance with the invention. The ID recycle scheme may reduce the number of object IDs used during connected component labeling and, therefore, reduce the amount of memory needed to store a component table. The ID recycle scheme may be implemented solely in hardware. In various embodiments, the ID recycle scheme for connected component labeling may be implemented according to the following implementation descriptions.

Figure 2:
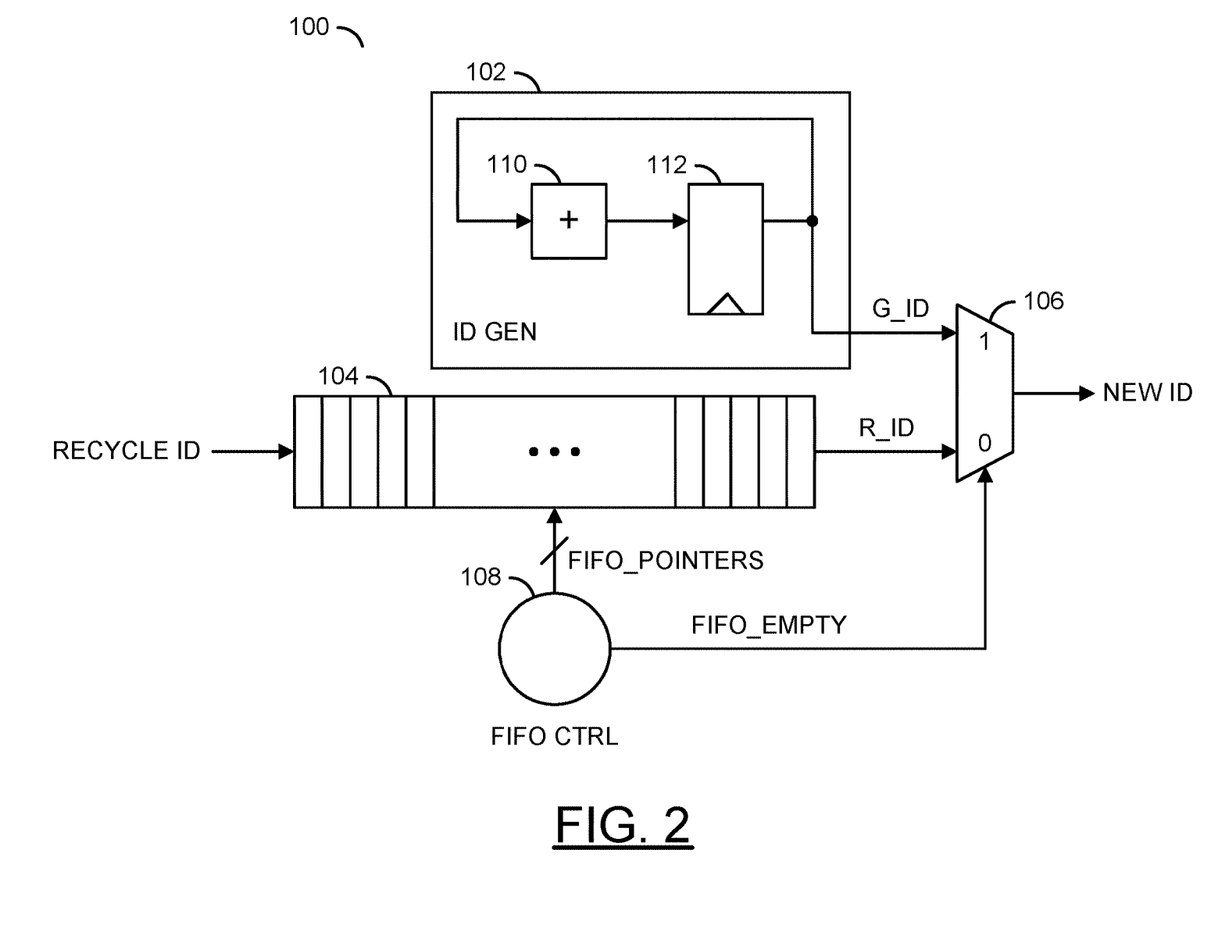
FIG. 2 is a diagram illustrating an example hardware implementation of ID recycle logic.

Referring to FIG. 2, a diagram of a circuit 100 is shown illustrating an example hardware implementation of the ID recycle logic 100 of FIG. 1. In an example, the circuit 100 may comprise a block (or circuit) 102, a block (or circuit) 104, a block (or circuit) 106, and a block (or circuit) 108. In an example, the circuit 102 may comprise a block (or circuit) 110 and a block (or circuit) 112. In various embodiments, the block 102 may implement an ID generator. The circuit 104 may implement a first-in first-out (FIFO) memory (or buffer). The block 106 may be implemented as a multiplexer circuit. The block 108 may implement a control circuit.

In an example embodiment, the circuit 102 may be configured to generate unique ID values (or labels). The unique ID values may be utilized to label objects detected during a connected component labeling operation. In an example, the circuit 102 may have an output that may present a signal (e.g., GID). The signal G_ID may be configured to communicate the unique IDs generated by the circuit 102.

The block 104 may have a first input that may receive a signal (e.g., RECYCLE ID), a second input that my receive a number of control signals (e.g., FIFO_POINTERS), and an output that may present a signal (e.g., R_ID). The signal RECYCLE ID may be configured to communicate object IDs that will no longer be referenced by the connected component labeling application (e.g., due to a merging or removal of objects). The object IDs carried by the signal RECYCLE ID may be pushed into the FIFO memory 104 (e.g., at a location determined by a write pointer implemented as part of the control signals FIFO_POINTERS). The signal R_ID may be configured to communicate a recycled object ID from the FIFO memory 104 for presentation as a new object ID for a newly detected object. The object ID carried by the signal R_ID may be popped from the FIFO memory 104 (e.g., from a location determined by a read pointer implemented as part of the control signals FIFO_POINTERS).

The circuit 106 may have a first data input that may receive the signal G_ID, a second data input that may receive the signal R_ID, a control input that may receive a signal (e.g., FIFO_EMPTY), and an output that may present a signal (e.g., NEW ID). In an example embodiment, the signal FIFO_EMPTY may be used to indicate when no IDs are queued for recycling. The circuit 106 may be configured to select between the two data inputs for presentation as the signal NEW ID in response to a state of the signal FIFO_EMPTY. In an example, the signal NEW ID may be utilized to communicate an object ID to a connected component labeling process for association with a newly detected object.

The circuit 108 generally controls the FIFO memory 104 and determines the source of ID labels used for newly detected objects. In general, when no ID labels are queued in the FIFO memory 104 (e.g., the signal FIFO_EMPTY is in an asserted state), the circuit 106 may present a unique ID label generated by the ID generator circuit 102 to an application detecting the objects. When one or more ID labels to be recycled (e.g., IDs that are no longer needed to label a component due to merging, removal, etc.) are queued in the FIFO memory 104 (e.g., the signal FIFO_EMPTY is in a de-asserted state), the circuit 106 may present the next ID to be recycled from the FIFO memory 104 to the application detecting objects.

In some embodiments, the circuit 102 may comprise a circuit 110 and a circuit 112. The circuit 110 may be implemented as an adder circuit. The circuit 112 may be implemented as a register circuit. An output of the circuit 112 may present the signal G_ID generated by the ID generator 102. The output of the circuit 112 also may be presented to an input of the circuit 110. An output of the circuit 110 may be presented to an input of the circuit 112. The circuit 110 may be configured to increment (add 1 to) the value presented by the circuit 112 in the signal G_ID. Each time a new ID is called for and there are no IDs available in the FIFO memory 104, the circuit 112 may be clocked causing the incremented value presented by the circuit 110 to be latched and presented at the output of the circuit 112. In another example, the ID generator circuit 102 may be implemented using a counter. The circuit 112 may be clocked whenever a new object is detected e.g., by the connected component labeling process) and the signal FIFO_EMPTY is asserted. In other words, the circuit 112 may be clocked whenever the generated ID carried by the signal G_ID is consumed by the connected component labeling process.

Figure 3:
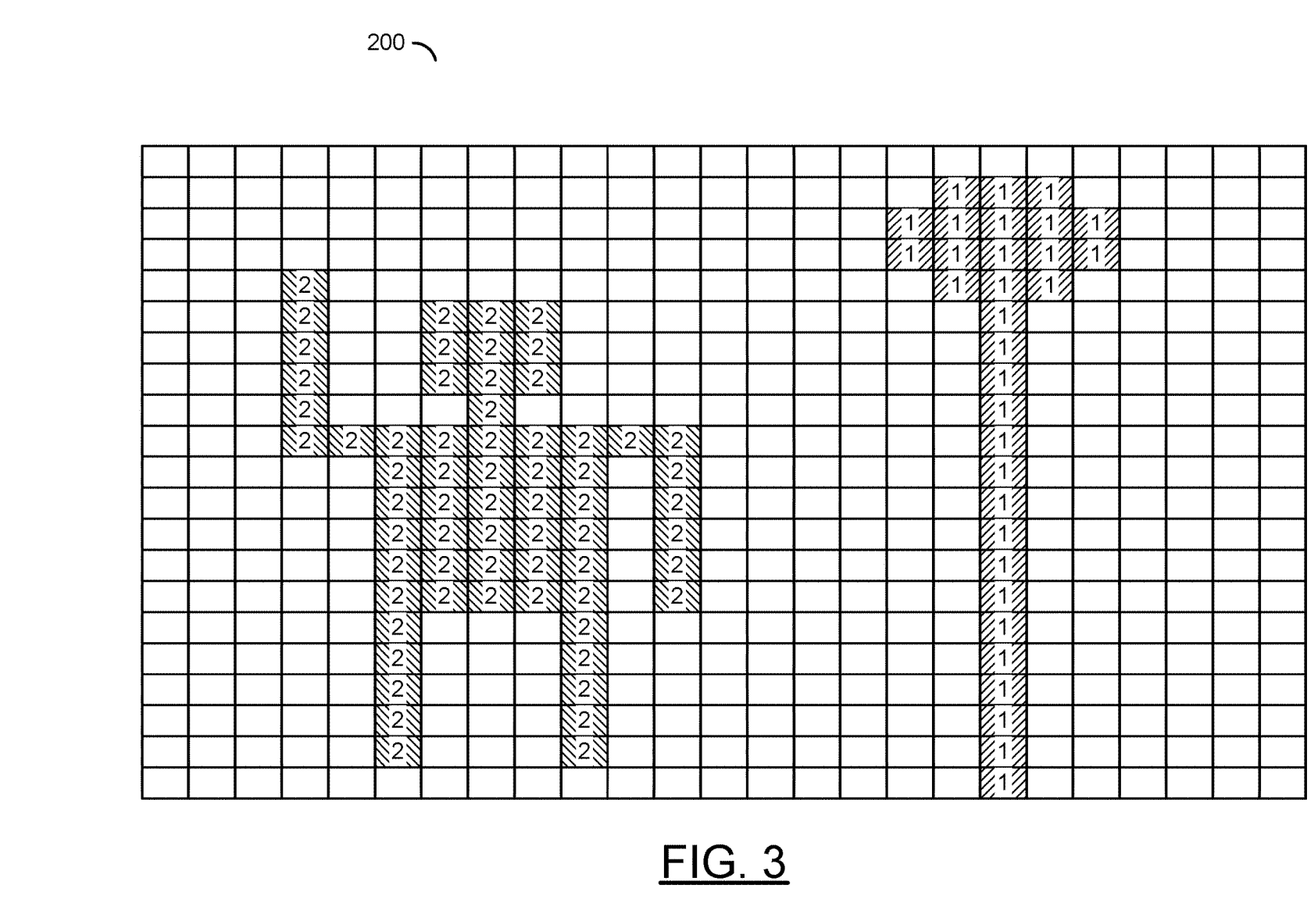
FIG. 3 is a diagram illustrating an image containing two objects made up of merged components.

Referring to FIG. 3, a diagram of an image 200 is shown illustrating two objects (labeled #1 and #2) made up of merged components. In an example, a two-pass connected component labeling technique may be used to label the two objects in the image 200. The two-pass technique generally iterates through 2-dimensional, binary data (e.g., making two passes over the image 200). In a first pass, temporary labels may be assigned and equivalences recorded. In a second pass, the temporary labels may be replaced by a label uniquely representing the equivalent class (or object). In an example, the labeling may be maintained in a separate data structure (e.g., a component table).

Figure 4A:
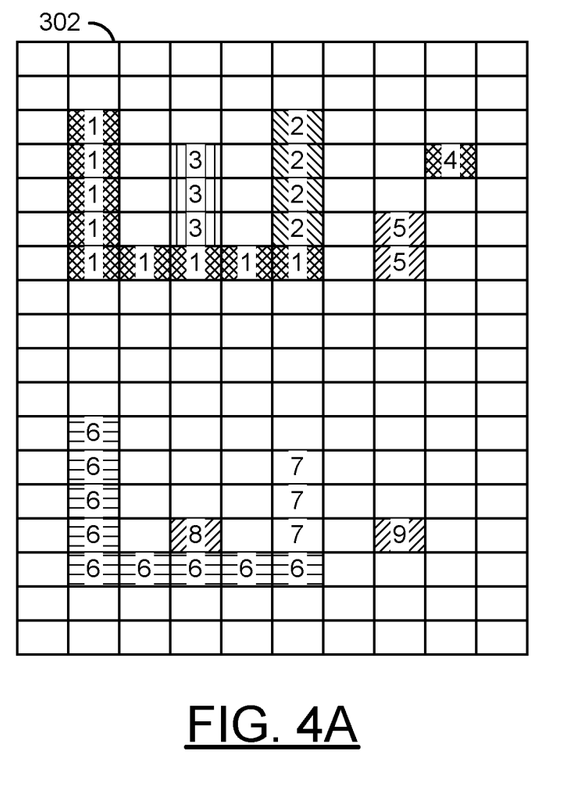
FIGS. 4A and 4B are diagrams illustrating connected component labeling of images without and with ID recycling in accordance with an example embodiment of the invention.
Figure 4B:
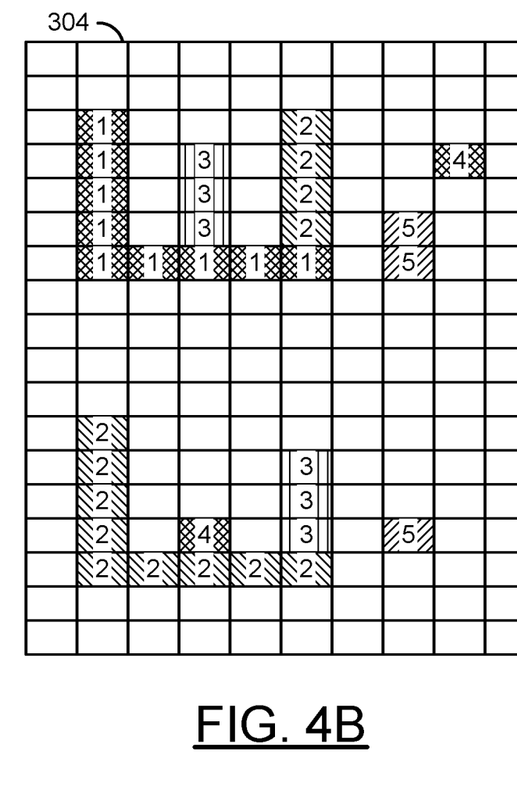

Referring to FIGS. 4A and 4B, diagrams of images 302 and 304 are shown illustrating a connected component labeling process without ID recycling (FIG. 4A) and a connected component labeling process with ID recycling in accordance with an example embodiment of the invention (FIG. 4B). The ID-recycle mechanism in accordance with an example embodiment of the invention may be used to reduce the cost of the component table needed to store the information for the objects in an image. In an example, a component table may comprise a number of rows and columns. Each row may contain information related to a particular object ID. A first column may contain the object IDs. In an example, a second column may contain link pointers. Link pointer entries generally contain the object ID of the subsequently identified component that a merge process linked to the component whose label is in the corresponding entry in the object ID column. The component table may be configured to store additional information about each component. In an example, the additional information may include, but is not limited to width, height, coordinate, and area. However, other information about each component may be stored accordingly to meet the design criteria of a particular implementation.

The number of objects in an image may be as high as one-half the total number of pixels (picture elements) in the image (e.g., up to about Height*Width/2). In an example, a 1920×1080 image may contain up to one million objects. The possible number of objects is an excessively huge number for a hardware implementation. Instead, an ID-recycle mechanism implemented in accordance with an example embodiment of the invention utilizes the fact that some objects in an image are merged or may be ignored (e.g., noise, dust, etc.) and, therefore, the respective entries (labels) of the component table for those objects may be reused (recycled).

During a connected component labeling operation, the shape of an object being labeled can be complex, the component table for certain objects may be very large. In an example of a "W"-shaped object, three labels would be needed to tag the three objects (branches) that are part of the "W". Assuming the object labels (IDs) used for the three branches are #1, #2, and #3, respectively, once the bottom of the "W" is reached, the branches may be merged. In an example where no ID recycling is implemented (FIG. 4A), nine object IDs are used to label the objects detected. Consequently, a component table with nine entries would be needed.

Referring to FIG. 4B, an example where ID recycling in accordance with the invention is implemented. In an example of a merge operation, objects (branches) #1 and #2 are merged with object #3. With ID recycling in accordance with the invention implemented, the labels that will no longer be referenced may be recycled (reused). In an example, where the merged object is labeled with the lowest valued object label (e.g., #1), the labels #2 and #3 can be recycled once it is determined the labels will no longer be referenced. In an example, where the merged object is labeled with the highest valued object label (e.g., #3), the labels #1 and #2 may be recycled once it is determined the labels will no longer be referenced.

The number of IDs may also be reduced by removing noise. In an example, components #4 and #5 are too small and thus are removed. Since the components #4 and #5 are removed (ignored), the labels #4 and #5 may also be reused. In the example illustrated in the upper half of FIG. 4B, five IDs are used but only one object is considered valid. Therefore, without ID recycling four IDs are wasted. In an example where an ID recycle mechanism is implemented, IDs are reused when the respective life-time ends. For example, an ID is recycled when an associated component is merged or removed. In general, the life-time of the recycled ID ends when the ID will no longer be looked up. In the example where ID recycling is not implemented (FIG. 4A), nine object IDs are used to label the components of the objects detected in the image 302. In the example where ID recycling is implemented (FIG. 4B), five object IDs are used to label the components of the objects detected in the image 304. Consequently, the component table used to store object IDs with ID recycling is smaller than the component table used to store object IDs without recycling.

The number of object IDs needed to identify the objects may be different than the number of object IDs used in the object detection process. At the end of an object detection scan of the images 302 and 304 only two object IDs are needed to uniquely label the valid objects in the images (similar to FIG. 3). However, in the example where ID recycling is implemented (FIG. 4B), the connected component labeling process utilizes a component table with five entries (IDs). Thus, five IDs (or component table entries) are "used" to label the "detected" objects in the image 304. The component table for the image 304 may be further reduced if only the IDs needed to uniquely identify the valid objects are kept. In an embodiment where the lowest object ID value is used to identify a merged object, once the detected objects (components) are merged and/or removed the remaining set of "valid" objects still used five object IDs (or table entries), but 3 of the used IDs may then be discarded to further reduce the component table storage for the image 304.

In general, connected component labeling may be used to find objects that meet predefined criteria (e.g., are big enough, etc). Small objects, such as dust, may be ignored during the connected component labeling analysis. Because objects are "seen" by a computer vision (or machine vision) system in raster-scan order, the computer vision (or machine vision) system can determine the object is small enough to ignore only when the bottom of the object is reached. In systems implementing ID recycling in accordance with an embodiment of the invention the labels used for the objects that may be ignored may be recycled whenever the computer vision (or machine vision) system confirms that the objects are small enough.

Figure 5:
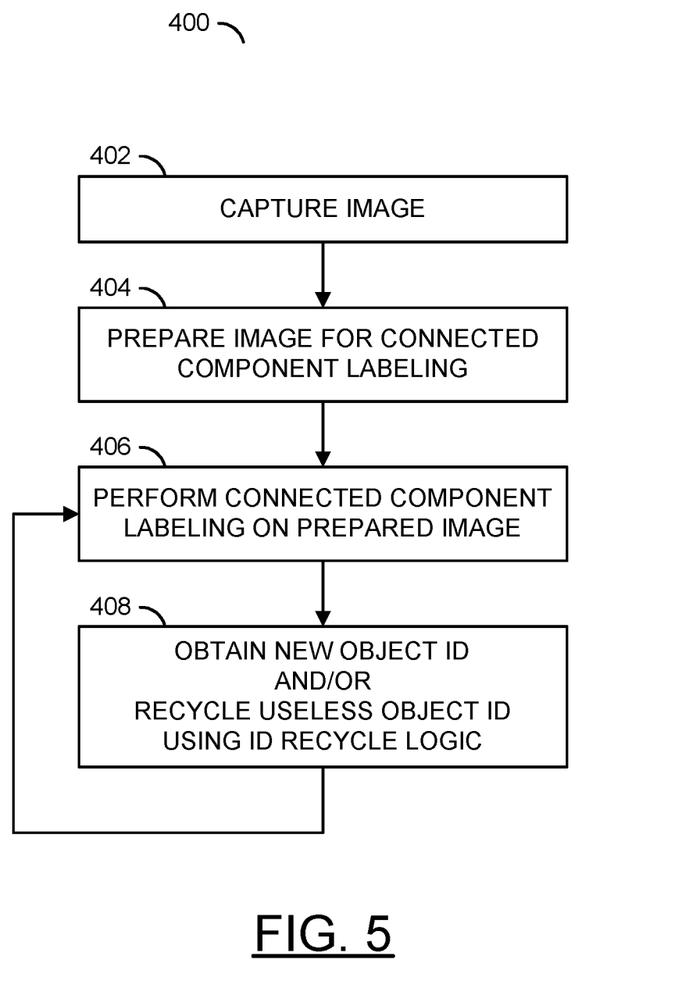
FIG. 5 is a diagram illustrating a process for connected component labeling with ID recycling in accordance with an example embodiment of the invention.

Referring to FIG. 5, a flow diagram of a process 400 is shown illustrating connected component labeling with object ID recycling in accordance with an example embodiment of the invention. In an example, the process (or method) 400 may comprise a step (or state) 402, a step (or state) 404, a step (or state) 406, and a step (or state) 408. In the step 402, the process 500 may capture an image. In the step 404, the process 400 may perform image processing to prepare the image captured in the step 402 for connected component labeling. In various embodiments, conventional image processing techniques may be utilized to prepare the captured image.

In the steps 406 and 408, the process 400 may perform connected component labeling with ID recycling on the prepared image from the step 404. In the step 406, the process 400 may perform connected component labeling on the prepared image using conventional techniques, except that object IDs used to label the detected components may be generated and/or recycled using an ID recycling logic (or process) in accordance with an embodiment of the invention. The object ID generating and/or recycling is generally performed in the step 408. In the step 408, the process 400 may (i) obtain a new object ID for a newly detected object from an ID recycle logic in accordance with an example embodiment of the invention and/or (ii) recycle (send) one or more useless (e.g., no longer being used) object IDs to the ID recycle logic in accordance with an example embodiment of the invention.

In an example, when the connected component labeling process performed in the step 406 detects a new object, processing may move to the step 408 where a request may be sent to the ID recycle logic 100 to obtain a new object ID for the newly detected object. The new object ID may be a newly generated object ID or an object ID that has previously been determined useless (e.g., no longer being looked up due to merging, removal, etc.). In addition, when the connected component labeling process performed in the step 406 determines that a current object (component) should be merged with one or more previously labeled objects, the connected component labeling process performed in the step 406 may send the one or more object labels which are no longer being used (useless IDs) to the step 408 for processing by the ID recycle logic 100. In the step 408, the ID recycle logic 100 prepares the useless IDs for use with future detected objects (e.g., the useless IDs are pushed into the FIFO memory 104 to be recycled). The steps 406 and 408 may be performed repeatedly until no new objects are detected.

Figure 6:
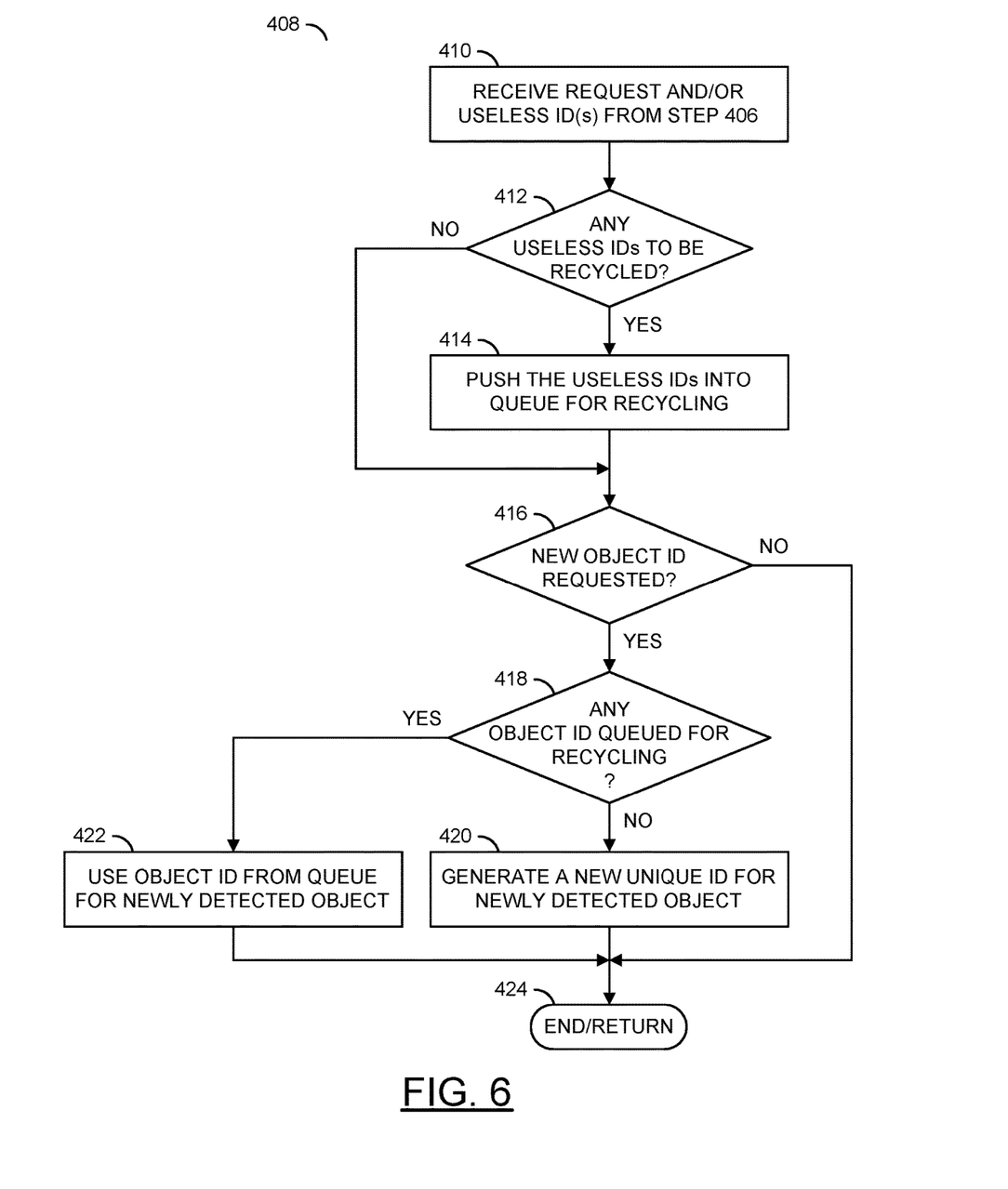
FIG. 6 is a diagram illustrating an ID recycling process in accordance with an example embodiment of the invention.

Referring to FIG. 6, a flow diagram is shown illustrating an example implementation of the object ID recycling step 408 in accordance with an example embodiment of the invention. In an example, the process (or method) performed in the step 408 may comprise a step (or state) 410, a step (or state) 412, a step (or state) 414, a step (or state) 416, a step (or state) 418, a step (or state) 420, a step (or state) 422, and a step (or state) 424. In an example embodiment, the steps 410 through 424 may be performed (implemented) solely in hardware. The ID recycle process of the step 408 generally begins in the step 410. In the step 410, the process 408 receives a request and/or useless IDs from the connected component labeling process being performed in the step 406. In an example, the request may comprise one or more of a request for a new object ID or a request communicating one or more useless object IDs to be recycled.

The process 408 generally moves from the step 410 to the step 412. In the step 412, the process 408 determines whether any useless IDs have been sent from the connected component labeling process for recycling by the ID recycling logic 100. If useless object IDs have been sent to be recycled, the process 408 moves to the step 414. If no useless object IDs are contained in the communication from the connected component labeling process of the step 406, the process 408 moves to the step 416. In the step 414, the process 408 pushes the useless IDs into the queue contained in the FIFO memory 104 and moves to the step 416. In the step 416, the process 408 determines whether a new object ID has been requested. If no new object ID is requested, the process 408 moves to the step 424 and terminates (e.g., returns to the connected component labeling process in the step 406).

If a new object ID has been requested, the process 408 moves to the step 418. In the step 418, the process 408 determines whether there are any object IDs queued for recycling. If no object IDs are queued for recycling (e.g., the signal FIFO_EMPTY is in an asserted state), the process 408 moves to the step 420. If there are object IDs queued for recycling, the process 408 moves to the step 422. In the step 420, the process 408 generates a new unique ID for the newly detected object (e.g., using the ID generator circuit 102), then moves to the step 424 and terminates (e.g., returning to the connected component labeling process in the step 406 with the newly generated object ID). In the step 422, the process 408 selects (pops) the next one of the useless object IDs from the queue in the FIFO memory 104 for use in labeling the newly detected object. The process 408 then moves to the step 424 and terminates (e.g., returning to the connected component labeling process in the step 406 with the recycled object ID).

Figure 7:
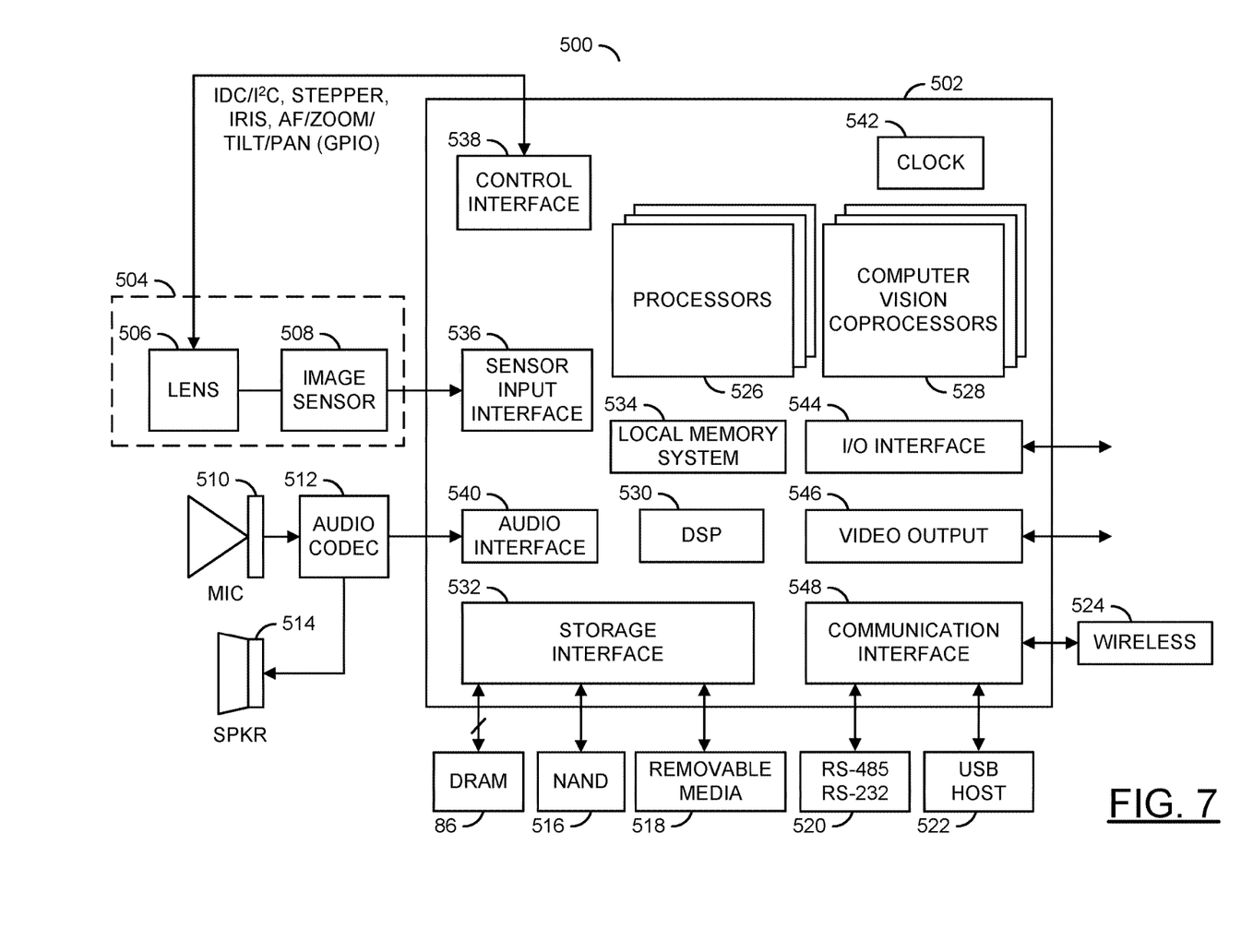
FIG. 7 is a diagram illustrating a camera system incorporating an ID recycle mechanism for connected component labeling in accordance with an example embodiment of the invention.

Referring to FIG. 7, a diagram of a camera system 500 is shown illustrating an example implementation of a local maxima sub-integer position estimation system in accordance with an embodiment of the present invention. In one example, the electronics of the camera system 500 may be implemented as one or more integrated circuits. For example, an application specific integrated circuit (ASIC) or system on chip (SOC) may be used to implement the camera system 500. The processor/camera circuit 502 generally incorporates hardware and/or software/firmware that may be configured to implement the processors, circuits, and processes described above in connection with FIG. 1 through FIG. 6.

In one example, the camera system 500 may comprise the DRAM circuit 86, a processor/camera chip (or circuit) 502, a block (or assembly) 504 having a block 506 and one or more blocks (or circuits) 508, a block (or circuit) 510, a block (or circuit) 512, a block (or circuit) 514, a block (or circuit) 516, a block (or circuit) 518, a block (or circuit) 520, a block (or circuit) 522 and a block (or circuit) 524. The circuits 86 and 504-524 may be connected to the camera circuit 502.

In various embodiments, the processor/camera circuit 502 may comprise one or more processors 526 (e.g., ARM, etc.), one or more coprocessors 528, a block (or circuit) 530, a block (or circuit) 532, a block (or circuit) 534, a block (or circuit) 536, a block (or circuit) 538, a block (or circuit) 540, a block (or circuit) 542, a block (or circuit) 544, a block (or circuit) 546 and a block (or circuit) 548. The circuits 82 through 548 may be connected to each other using one or more buses, traces, protocols, etc.

The circuit 504 may implement a lens and sensor assembly. The lens and sensor assembly 504 is shown connected to the processor/camera circuit 502. In some embodiments, the lens and sensor assembly 504 may be a component of the processor/camera circuit 502 (e.g., a SoC component). In some embodiments, the lens and sensor assembly 504 may be a separate component from the processor/camera circuit 502 (e.g., the lens and sensor assembly may be an interchangeable component compatible with the processor/camera circuit 502). In some embodiments, the lens and sensor assembly 504 may be part of a separate camera connected to the processing portion of the processor/camera circuit 502 (e.g., via a video cable, a high definition media interface (HDMI) cable, a universal serial bus (USB) cable, an Ethernet cable, or wireless link). The lens and sensor assembly 504 may comprise other components (not shown). The number, type and/or function of the components of the lens and sensor assembly 504 may be varied according to the design criteria of a particular application.

The block 506 may implement a lens 506. The lens 506 may capture and/or focus light input received from the environment near the camera 500. The lens 506 may capture and/or focus light for the circuit 508. The lens 506 may be implemented as an optical lens. The lens 506 may provide a zooming feature and/or a focusing feature. The lens and sensor assembly 504 may be implemented with additional circuitry (e.g., motors) to adjust a direction, zoom and/or aperture of the lens 506. The lens 506 may be directed, tilted, panned, zoomed and/or rotated to provide a targeted view of the environment near the camera 500.

The circuit 508 may implement an image sensor. The image sensor 508 may receive light from the lens 506. The image sensor 508 may be configured to transform the received focused light into digital data (e.g., bitstreams). In some embodiments, the image sensor 508 may perform an analog to digital conversion. For example, the image sensor 508 may perform a photoelectric conversion of the focused light received from the lens 506. The image sensor 508 may present the converted image data as a color filter array (CFA) formatted bitstream. The processor/camera circuit 502 may transform the bitstream into video data, video files and/or video frames (e.g., human-legible content).

The circuit 510 may be a microphone for capturing audio. The circuit 512 may be an audio codec for recording audio in a particular format. The circuit 514 may be a speaker for playing audio.

The circuit 516 may implement a nonvolatile memory (e.g., NAND flash memory, NOR flash memory, etc.). The circuit 518 may implement a removable media 518 (e.g., secure digital media (SD), secure digital extended capacity media (SDXC), etc.). The circuit 520 may implement one or more serial communication channels 520 (e.g., RS-485, RS-232, etc.). The circuit 522 may implement one or more universal serial bus (USB) hosts 522 and/or USB interfaces. The circuit 524 may implement wireless interface for communicating with a user device (e.g., a smart phone, a computer, a tablet computing device, cloud resources, etc.). In various embodiments, the wireless interface 524 and/or the USB Host 522 may be configured for communicating with a camera controller wirelessly. In the embodiment shown, the circuits 504-524 are implemented as components external to the processor/camera circuit 502. In some embodiments, the circuits 504-524 may be components on-board the processor/camera circuit 502.

The circuit 530 may be a digital signal processing (DSP) module. In some embodiments, the circuit 530 may implement separate image DSP and video DSP modules. The DSP module 530 may be configured to process digital signals. The DSP module 530 may comprise an image digital signal processor (IDSP), a video digital signal processor DSP (VDSP) and/or an audio digital signal processor (ADSP). The DSP module 530 may be configured to receive information (e.g., pixel data values captured by the image sensor 508) from the circuit 536. The DSP module 530 may be configured to determine the pixel values (e.g., RGB, YUV, luminance, chrominance, etc.) from the information received from the sensor input 536. The DSP module 530 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The circuit 532 may be a storage interface. The storage interface 532 may be configured to manage one or more types of storage and/or data access. In one example, the storage interface 532 may implement a direct memory access (DMA) engine and/or a graphics direct memory access (GDMA). In another example, the storage interface 532 may implement a secure digital (SD) card interface (e.g., to connect to the removable media 518).

The circuit 534 may implement a local memory system (e.g., cache, fast random access memory, etc.). In various embodiments, programming code (e.g., executable instructions for controlling various processors and encoders of the processor/camera circuit 502) may be stored in one or more of the memories (e.g., the DRAM circuit 86, the NAND 516, etc.). When executed by the processors 526, the programming code generally causes one or more components in the processor/camera circuit 502 to configure video synchronization operations and start video frame processing operations. The resulting compressed video signal may be presented to the storage interface 532, the video output 546 and/or the communication module 548. The storage interface 532 may transfer program code and/or data between external media (e.g., the DRAM circuit 86, the NAND 516, the removable media 518, etc.) and the local (internal) memory system 534.

The circuit 536 may implement a sensor input (or interface). The sensor input 536 may be configured to send/receive data to/from the image sensor 508. In one example, the sensor input 536 may comprise an image sensor input interface. The sensor input 536 may be configured to transmit captured images (e.g., light data) from the image sensor 508 to the DSP module 530 and/or the processors 526. The data received by the sensor input 536 may be used by the DSP 530 to determine a luminance (Y) and chrominance (U and V) values from the image sensor 508. The sensor input 536 may provide an interface to the lens and sensor assembly 504. The sensor input 536 may enable the processor/camera circuit 502 to capture image data from the lens and sensor assembly 504.

The circuit 538 may implement one or more control interfaces including but not limited to an inter device communication (IDC) interface, an inter integrated circuit (I²C) interface, a serial peripheral interface (SPI), and a pulse width modulation (PWM) interface. The control interface 538 may be configured to generate signals (e.g., IDC/I2C, STEPPER, IRIS, AF/ZOOM/TILT/PAN, etc.) for controlling the lens and sensor assembly 504. The signal IRIS may be configured to adjust an iris for the lens and sensor assembly 504. The control interface 538 may enable the processor/camera circuit 502 to control the lens and sensor assembly 504.

The circuit 540 may implement an audio interface (e.g., an I²S interface, etc.). The audio interface 540 may be configured to send/receive audio data. In one example, the audio interface 540 may implement an audio inter-IC sound (I²S) interface. The audio interface 540 may be configured to send/receive data in a format implemented by the audio codec 512. The circuit 542 may implement a clock circuit including but not limited to a real time clock (RTC), a watchdog timer (WDT), and/or one or more programmable timers.

The circuit 544 may implement an input/output (I/O) interface. The I/O interface 544 may be configured to send/receive data. The data sent/received by the I/O interface 544 may be miscellaneous information and/or control data. In one example, the I/O interface 544 may implement a general purpose input/output (GPIO) interface. In another example, the I/O interface 544 may implement an analog-to-digital converter (ADC) module and/or digital-to-analog converter (DAC) module. In yet another example, the I/O interface 544 may implement an infrared (IR) remote interface. In still another example, the I/O interface 544 may implement one or more synchronous data communications interfaces (IDC SPI/SSI).

The circuit 546 may be a video output module. The video output module 546 may be configured to send video data. For example, the camera system 500 may be connected to an external device (e.g., a TV, a monitor, a laptop computer, a tablet computing device, etc.). The video output module 546 may implement a high-definition multimedia interface (HDMI), an LCD/TV/Parallel interface and/or a DisplayPort interface. The video data may be presented in one or more formats (e.g., PAL, NTSC, VGA, WVGA, QVGA, SD, HD, Ultra HD, 4K, etc.).

The circuit 548 may be a communication module. The communication module 548 may be configured to send/receive data. The data sent/received by the communication module 548 may be formatted according to a particular protocol (e.g., Bluetooth, USB, Wi-Fi, UART, etc.). In one example, the communication module 548 may implement a secure digital input output (SDIO) interface. The communication module 548 may include support for wireless communication by one or more wireless protocols such as Bluetooth®, ZigBee, Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX and/or SMS. The communication module 548 may also include support for communicating using one or more of the universal serial bus protocols (e.g., USB 1.0, 2.0, 3.0, etc.). The processor/camera circuit 502 may also be configured to be powered via a USB connection. However, other communication and/or power interfaces may be implemented accordingly to meet the design criteria of a particular application.

In general, a connected component operation is frequently used in image processing. The connected component operation utilizes a component table to store the information about the components. The number of entries in the component table may be up to about one-half the product of the height and width of an image (e.g., H*W/2), which is excessively huge. In practice, the actual number of the components is significantly less. To reduce the cost of the component table, the number of IDs used may be reduced through ID recycling in accordance with an embodiment of the invention.

In general, the number of IDs used may be greater than the number of objects found. Components of objects may be merged (e.g. components #2 and #3 are merged to component#1). Components that do not meet predefined criteria (e.g., too small, dust, noise, etc.) may be removed. The IDs of merged components and removed components may be reused, thus reducing the size and cost of the component table needed to hold the image information.

The functions and structures illustrated in the diagrams of FIGS. 1 to 7 may also be implemented, designed, modeled, emulated, and/or simulated using one or more of a conventional general purpose processor, digital computer, microprocessor, microcontroller, distributed computer resources, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines, virtual machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, preprocessors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
 a processor circuit configured to generate a component table while performing a connected component labeling process on a digital image; and
 an ID recycle circuit in communication with said processor circuit and configured to minimize a number of entries in said component table generated by said processor circuit, wherein said ID recycle circuit is configured to (i) present a recycled label value as a new ID value for a newly detected object when a label value to be recycled is available and (ii) generate a new unique label value as the new ID value for the newly detected object when no label value to be recycled is available.

2. The apparatus according to claim 1, wherein said ID recycle circuit reuses entries in said component table for different objects in said digital image.

3. The apparatus according to claim 1, wherein said ID recycle circuit is part of a coprocessor circuit associated with said processor circuit.

4. The apparatus according to claim 1, wherein said ID recycle circuit comprises:
 an ID generator circuit configured to generate unique label values;
 a first-in-first-out memory configured to queue label values to be recycled;
 a multiplexer circuit configured to select between an output of said ID generator circuit and an output of said first-in-first-out memory for presentation as said new ID value for said newly detected object; and
 a control circuit configured to control said first-in-first-out memory and said multiplexer circuit.

5. The apparatus according to claim 4, wherein said control circuit is configured such that:
 when no IDs are queued for recycling, said ID recycle circuit generates a unique ID value for a newly found object; and
 when at least one ID is queued for recycling said ID recycle circuit reuses the at least one queued ID for newly found objects.

6. The apparatus according to claim 4, wherein said ID generator circuit comprises:
 a register configured to store a current unique label value; and
 an adder circuit configured to generate an incremented version of the current unique label value, wherein the current unique label value is replaced by the incremented version of the current unique label value each time the current unique label value is consumed by the connected component labeling process.

7. The apparatus according to claim 1, wherein said ID recycle circuit is implemented solely in hardware.

8. The apparatus according to claim 1, wherein said processor circuit and said ID recycle circuit are implemented as part of an integrated circuit.

9. The apparatus according to claim 1, wherein said processor circuit and said ID recycle circuit are implemented as part of a system on chip (SoC).

10. The apparatus according to claim 1, wherein said processor circuit and said ID recycle circuit are implemented as part of a camera chip.

11. A method of connected component labeling comprising:
 generating a component table while performing a connected component labeling process on a digital image; and
 minimizing a number of entries in said component table by recycling ID labels no longer associated with objects in said digital image, wherein (i) when a label value to be recycled is available, the label value to be recycled is presented as a new ID value for a newly detected object, and (ii) when no label value to be recycled is available, a newly generated unique label value is presented as the new ID value for the newly detected object.

12. The method according to claim 11, further comprising:
 queuing ID label values to be recycled in a first-in-first-out memory.

13. The method according to claim 12, wherein:
 generating a unique ID label value for a newly found object when no ID label value to be recycled is queued in said first-in-first-out memory for recycling; and
 reusing an ID label value from said first-in-first-out memory for said newly found object when at least one ID label value is queued for recycling.

14. The method according to claim 12, wherein:
 said ID label values are queued for recycling when an associated object in said digital image is merged or removed from consideration as a valid object.

15. The method according to claim 14, wherein:
 said associated object is removed from consideration as said valid object when said associated object does not meet predefined criteria associated with valid objects.

16. The method according to claim 15, wherein:
 said predefined criteria comprise one or more of size, color, or shape.

17. The method according to claim 11, wherein said connected component labeling process and said recycling of ID labels are implemented in a computer vision system.

18. The method according to claim 11, wherein said recycling of ID labels comprises:
- receiving a request from said connected component labeling process;
- determining whether any ID label values are to be recycled; and
- if one or more ID label values are to be recycled, pushing the one or more ID label values into a first-in first-out memory.

19. The method according to claim 18, wherein said recycling of ID labels further comprises:
- determining whether a new object ID label value is requested by the connected component labeling process;
- when a new object ID label value is requested, determining whether an object ID label value is queued for recycling;
- if an object ID label value is queued for recycling, popping the object ID label value from the first-in first-out memory and communicating the popped object ID label value to the connected component labeling process; and
- if an object ID label value is not queued for recycling, generating a new unique object ID label value and communicating the newly generated object ID label value to the connected component labeling process.

20. The method according to claim 19, wherein generating the new unique object ID label value comprises incrementing a previously generated unique object ID label value.

* * * * *